United States Patent [19]

Penz

[11] Patent Number: 5,053,974
[45] Date of Patent: Oct. 1, 1991

[54] CLOSENESS CODE AND METHOD

[75] Inventor: Perry A. Penz, Richardson, Tex.

[73] Assignee: Texas Instruments Incorporated, Dallas, Tex.

[21] Appl. No.: 624,481

[22] Filed: Dec. 4, 1990

Related U.S. Application Data

[63] Continuation of Ser. No. 542,675, Jun. 22, 1990, abandoned, which is a continuation of Ser. No. 032,887, Mar. 31, 1987, abandoned.

[51] Int. Cl.⁵ .............................................. G06F 15/18
[52] U.S. Cl. ...................................... 304/513; 382/15
[58] Field of Search ..................... 364/513; 382/14, 15

[56] References Cited

U.S. PATENT DOCUMENTS

| | | | |
|---|---|---|---|
| 3,950,733 | 4/1976 | Cooper et al. | 382/1 |
| 4,773,024 | 9/1988 | Faggin et al. | 382/15 |
| 4,802,103 | 1/1989 | Faggin et al. | 382/15 |
| 4,805,225 | 2/1989 | Clark | 382/15 |

OTHER PUBLICATIONS

Computing with Neutral Circuits: A Model; Science; vol. 233; 8 Aug. 1986; Hopfield et al.; pp. 625-633.
Boltzmann Machines: Constraint Satisfaction Networks that Learn; Hinton et al.; Tech. Report CMU-CS-8-5-119; Carnegie-Mellon Univ.; 5/84.
Neurons with graded response have collective computational properties like those of two-state neurons; Hopfield; Proc. Natl. Acad. Sci. USA; vol. 81; pp. 3088-3092; May 1984.
Non-Holographic Associative Memory; Nature; vol. 222; pp. 960-962; Jun. 7, 1969; Willshaw et al.
A Possible Organization of Animal Memory and Learning; L. N. Cooper; Nobel 24 (1973); Collective Properties of Physical Systems; pp. 252-264.
Neural Networks and Physical Systems with Emergent Collective Computational Abilities; Hopfield; Proc. Natl. Acad. Sci. USA; vol. 79, Apr. 1982; pp. 2554-25558.

Primary Examiner—Allen R. MacDonald
Attorney, Agent, or Firm—James C. Kesterson; James T. Comfort; Melvin Sharp

[57] ABSTRACT

Preferred embodiments include encoders and encoding methods for encoding integers as sparse binary vectors as used in neural networks. The encoding is by position of nonzero components; such as for N component vectors, the integer n is represented by a sequence of n components equal to zero followed by a sequence of $\log_2 N$ components equal to one and then a sequence of $N - n - \log_2 N$ components equal to zero. Other preferred embodiments include permutations of vector components while retaining the same number of nonzero components and also with partitioning into more and less significant subvectors.

16 Claims, 4 Drawing Sheets

Fig. 3

N = 16
$\log_2 N = 4$
$\Delta H / \Delta N = 2$
$\Delta H(MAX) = 8 = 2 \log_2 N$
ALL VECTORS HAVE SAME MAGNITUDE = $\log_2 N$
GENERALIZES FOR $N = 2^M$

N=16 CLOSENESS CODE A

| n | V V V V<br>0 1 2 3 | V V V V<br>4 5 6 7 | V V V V<br>8 9 10 11 | V V V V<br>12 13 14 15 | V V V<br>16 17 18 |
|---|---|---|---|---|---|
| 0  | 1 1 1 1 | 0 0 0 0 | 0 0 0 0 | 0 0 0 0 | 0 0 0 |
| 1  | 0 1 1 1 | 1 0 0 0 | 0 0 0 0 | 0 0 0 0 | 0 0 0 |
| 2  | 0 0 1 1 | 1 1 0 0 | 0 0 0 0 | 0 0 0 0 | 0 0 0 |
| 3  | 0 0 0 1 | 1 1 1 0 | 0 0 0 0 | 0 0 0 0 | 0 0 0 |
| 4  | 0 0 0 0 | 1 1 1 1 | 0 0 0 0 | 0 0 0 0 | 0 0 0 |
| 5  | 0 0 0 0 | 0 1 1 1 | 1 0 0 0 | 0 0 0 0 | 0 0 0 |
| 6  | 0 0 0 0 | 0 0 1 1 | 1 1 0 0 | 0 0 0 0 | 0 0 0 |
| 7  | 0 0 0 0 | 0 0 0 1 | 1 1 1 0 | 0 0 0 0 | 0 0 0 |
| 8  | 0 0 0 0 | 0 0 0 0 | 1 1 1 1 | 0 0 0 0 | 0 0 0 |
| 9  | 0 0 0 0 | 0 0 0 0 | 0 1 1 1 | 1 0 0 0 | 0 0 0 |
| 10 | 0 0 0 0 | 0 0 0 0 | 0 0 1 1 | 1 1 0 0 | 0 0 0 |
| 11 | 0 0 0 0 | 0 0 0 0 | 0 0 0 1 | 1 1 1 0 | 0 0 0 |
| 12 | 0 0 0 0 | 0 0 0 0 | 0 0 0 0 | 1 1 1 1 | 1 0 0 |
| 13 | X 0 0 0 | 0 0 0 0 | 0 0 0 0 | 0 1 1 1 | 1 1 0 |
| 14 | X X 0 0 | 0 0 0 0 | 0 0 0 0 | 0 0 1 1 | 1 1 1 |
| 15 | X X X 0 | 0 0 0 0 | 0 0 0 0 | 0 0 0 1 | 1 1 1 |

WRAP AROUND $\log_2 N - 1$ EX (F.A)

$N = 16$ $LOG_2 N = 4$ $\Delta H / \Delta N = 2$ $\Delta H(MAX) = 8$ $|V| = 4 = LOG_2 N$

N = 16 CLOSENESS CODE B

| Vi / n | | | | | EXTRA |
|---|---|---|---|---|---|
| 0 |   |   |   |   |   |
| 1 | 1 |   |   |   |   |
| 2 | 1 | 1 |   |   |   |
| 3 | 1 | 1 | 1 |   |   |
| 4 |   | 1 | 1 |   |   |
| 5 | 1 | 1 | 1 | 1 |   |
| 6 | 1 | 1 | 1 | 1 |   |
| 7 | 1 | 1 | 1 |   |   |
| 8 |   | 1 | 1 | 1 |   |
| 9 | 1 | 1 | 1 | 1 |   |
| 10 | 1 | 1 | 1 | 1 |   |
| 11 | 1 |   | 1 | 1 |   |
| 12 |   |   | 1 | 1 | 1 |
| 13 | X |   |   | 1 | 1 |
| 14 | X | X |   | 1 | 1 |
| 15 | X | X | X |   | 1 |

X WRAP AROUND

Fig. 4

CLOSENESS CODE AND METHOD

This application is a continuation of application Ser. No. 07/542,675, filed 06/22/90 now abandoned, which is a continuation of application Ser. No. 032,887, filed 03/31/87 now abandoned.

BACKGROUND OF THE INVENTION

1. Field of the Invention.

The present invention relates to computation, and more particularly, to encoding inputs to neural network and related distributed memory and computation devices.

2. Description of the Related Art.

Attempts to understand the functioning of the human brain have led to various "neural network" models in which large numbers of neurons are interconnected. These models roughly presume each neuron exists in one of two states (quiescent and firing) with the state determined by the states of connected nuerons (if enough connected neurons are firing, then the original neuron should be in the firing state); and the thrust of the models is to perform computations such as pattern recognition with the neural networks.

J. Hopfield, Neural Networks and Physical Systems with Emergent Collective Computational Abilities, 79 Proc.Natl.Acad.Sci. USA 2554 (1982) describes a neural network model with N neurons each of which has the value 0 or 1 (corresponding to quiescent and to firing), so the state of the network is then a N-component vector $V = [V_1, V_2, \ldots, V_N]$ of 0's and 1's which depends upon time. The neuron interconnections are described by a matrix $T_{i,j}$ defining the influence of the $j^{th}$ neuron on the $i^{th}$ neuron. The state of the network evolves in time as follows: each neuron i has a fixed threshold $\theta_i$ and readjusts its state $V_i$ randomly in time by setting $V_i$ equal to 0 or 1 depending on whether $$\sum_j T_{i,j} V_j - \theta_i$$

is negative or positive. All neurons have the same average rate of readjustment, and the readjustments define a dynamical flow in state space.

With the assumption that $T_{i,j}$ is symmetric, the potential function $$\sum_i \sum_j T_{i,j} V_i V_j$$

can be used to show that the flow of the network is to local minima of the potential function. Further, with a given set of uncorrelated N-component vectors $U^1, U^2, \ldots, U^s$, a $T_{i,j}$ can be defined by $$T_{i,j} = \sum_{1 \leq k \leq s} (2U_i^k - 1)(2U_j^k)$$

and with the thresholds equal to 0, these $U^k$ are the fixed points of the flow and thus stable states of the network. Such a network can act as a content-addressable memory as follows: the memories to be stored in the network are used to construct the $U^k$ and hence $T_{i,j}$, so the stored memories are fixed points of the flow. Then a given partial memory is input by using it to define the initial state of the network, and the state will flow usually to the closest fixed point/stable state $U^k$ which is then the memory recalled upon input of the partial memory.

Further analysis and modified network models appear in, for example, J. Hopfield et al, Computing with Neural Circuits: A Model, 233 Science 625 (1986) and J. Hopfield, Neurons with Graded Response Have Collective Computational Properties like Those of Two-State Neurons, 81 Proc.Natl.Acad.Sci. USA 3088 (1984).

D. Willshaw et al, Non-Holographic Associateive Memory, 222 Nature 960 (1969) analyzed the storage capacity of a network of N neurons and concluded that states represented by sparse vectors (the N-component vectors have almost all components equal to 0 which corresponds to almost all neurons quiescent) can be used to store nearly the theoretical maximum amount of information and still have reliable recall if the number of non-zero components is $\log_2 N$.

D. Ackley et al, A Learning Algorithm for Boltzmann Machines, 9 Cognitive Science 147 (1985) describe neural networks with additional adjustment mechanisms for the neurons which analogize thermal fluctuations; this permits escape from local minima of the potential function. However, this disrupts the flow to fixed points for memory recall of the Hopfield type neural networks.

L. Cooper, A Possible Organization of Animal Memory and Learning, Proc.Nobel Symp.Coll.Prop.Phys.-Sys. 252 (Academic, New York 1973) observes that the modelling of neural network for animal memory and learning has the problem of mapping events in the animal's environment (i.e., sensory output) to signal distributions in the animal's neurons with the fundamental property of preserving closeness or separateness (in some sense not yet completely defined) of the events. That is, with a vector representation of the neural network states, two events as similar as a white cat and a gray cat should map into vectors which are close to parallel while two events as different as the sound of a bell and the sight of food should map into vectors that are close to orthogonal. Note that standard analysis, such as described in Gonzalez and Wintz, Digital Image Processing (Addison-Wesley 1977), does not use neural network computation and does not have this problem; rather, the standard analysis attempts to extract features and categorize by serial number crunching.

However, the problem of encoding sensor output for neural network input to preserve some sense of closeness is not solved in the known neural networks.

SUMMARY OF THE INVENTION

The present invention provides encoding of integers to neural network compatible sparse vectors by location of the non-zero components indicating the encoded integer. Preferred embodiments include encoding integers from 1 to N as N (or $N + \log_2 N - 1$) component vectors with a block of $\log_2 N$ 1's preceded and followed by strings of 0's, the number of initial 0's equals the integer being encoded. Further preferred embodiments include a partitioning of N component vectors into two sparse N/2 component vectors (each with $\log_2 N/2$ 1's) with the first of the N/2 component vectors encoding multiples of N/2 and the second encoding 0 to N/2; this is analogous to the hours and minutes in a clock.

This encoding solves the problem of preserving closeness for encoding sensor output to neural network compatible input.

BRIEF DESCRIPTION OF THE DRAWINGS

The drawings are schematic for clarity.

FIG. 3 is a first preferred embodiment encoding; and

FIG. 4 is a second preferred embodiment encoding.

DESCRIPTION OF THE PREFERRED EMBODIMENTS

Figure 1:
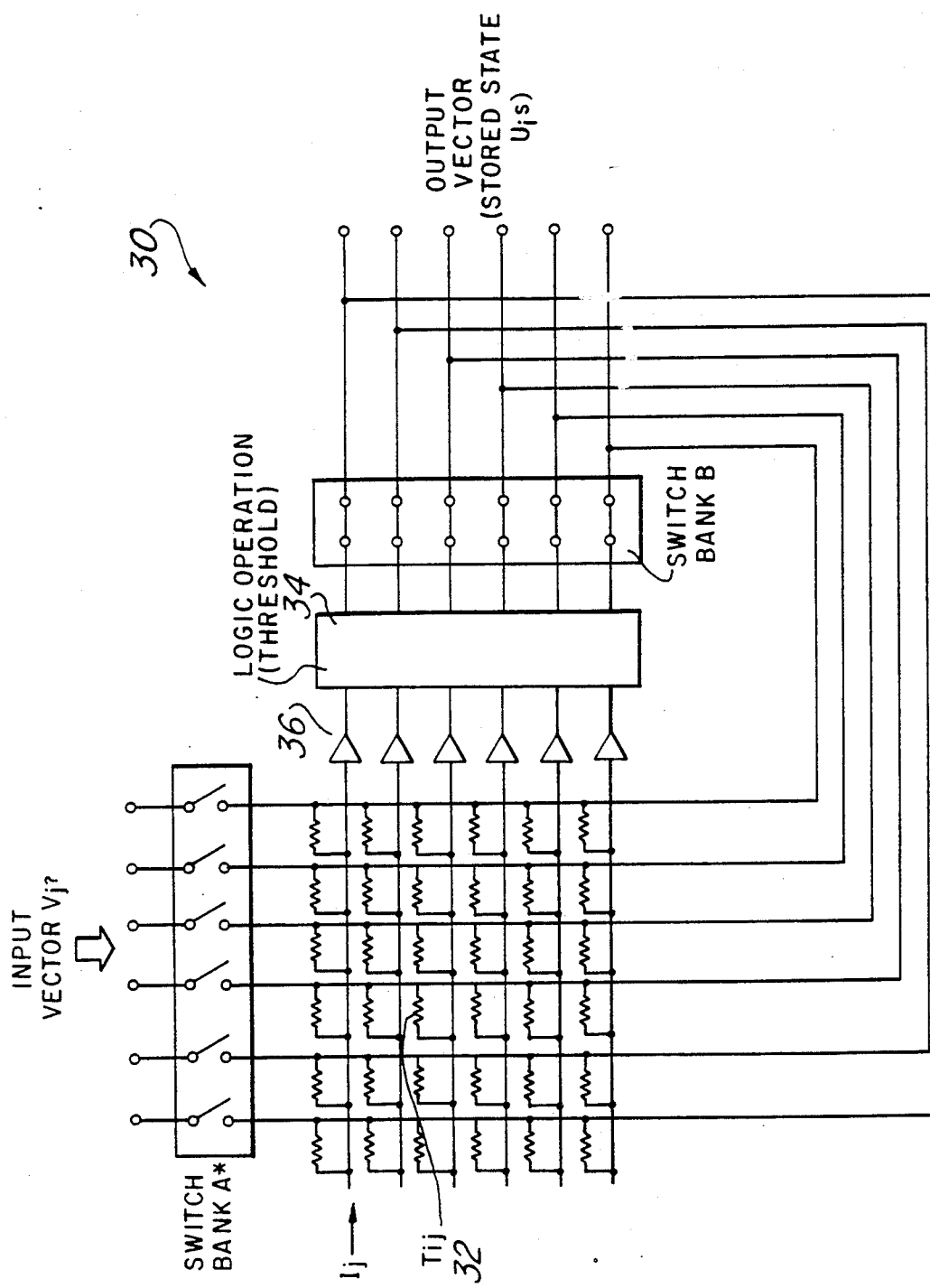
FIG. 1 illustrates a possible electronic hardware implementation of a neural network.

The preferred embodiments are best described in the context of a specific neural network model. So consider a two-state threshold model of N neurons connected in a network, and presume each of N neurons has two states: the output of the $j^{th}$ neuron is denoted $V_j$ and may only have the value 0 or 1. The $j^{th}$ neuron's output is connected to the $i^{th}$ neuron's input with a synaptic interconnection strength $T_{i,j}$, and the $i^{th}$ neuron may also have an external input $I_i$. Thus for each i the total input to the $i^{th}$ neuron is given by:

$$\sum_{1 \leq j \leq N} T_{i,j} V_j + I_i$$

Note that the term $T_{i,i}$ represents a self-stimulation of the $i^{th}$ neuron and that $T_{i,i}=0$ is traditionally presumed; however, this is not necessary in the following. For expositional simplicity, T will be presumed symmetric: $T_{i,j}=T_{j,i}$, although this does not affect the preferred embodiments.

Each of the N neurons is presumed to respond at random times to its then-current total input and adjust its output as follows:

$$V_i \rightarrow 0 \text{ if } \sum_j T_{i,j} V_j + I_i < \theta_i$$

$$V_i \rightarrow 1 \text{ if } \sum_j T_{i,j} V_j + I_i > \theta_i$$

where $\theta_i$ is a threshold for the $i^{th}$ neuron. These repeated responses of the outputs to the then-current inputs constitutes the dynamical evolution of the network of neurons and may be described as a flow in a state space. More specifically, define a state of the network at time t as an N-component vector V with its $i^{th}$ component equal to the output of the $i^{th}$ neuron ($V_i$) at time t. In other words, V is a vector of 0's and 1's. (The dependence of V on t is suppressed for clarity.) Thus the state space is isomorphic to the vertices of a unit hypercube in N-dimensional euclidean space, and each dynamical change of a $V_i$ translates into a change from the state corresponding to one vertex to the state corresponding to a second vertex connected by an edge to the first vertex.

The dynamical flow can be described by a potential (Liapunov) function as follows: define $$E(V) = -\frac{1}{2} \sum_{i,j} T_{i,j} V_i V_j - \sum_j V_j(I_j - \theta_j)$$

Note that the time dependence of V has been suppressed. A change in a component of V, say $V_k$, is denoted by $\Delta V_k$ and implies a change in E equal to $$\Delta E(V) = -\left(\sum_j T_{k,j} V_j + I_k - \theta_k\right)\Delta V_k.$$

$V_k$ can only change from 0 to 1 or from 1 to 0, so $\Delta V_k$ is either $+1$ or $-1$, and the rule for $V_k$ changes implies that $\Delta E$ is always negative because the term in the parentheses is negative for $V_k$ changing from 1 to 0 and positive for $V_k$ changing from 0 to 1. Thus E is monotonically decreasing during the dynamical flow, and the fixed points are states that are local minima of E. Of course, the state space is discrete and finite, so the dynamical flow is a finite sequence of jumps.

The neural network behaves as an associative memory when the dynamical flow in state space has fixed points which attract nearby states. As illustrated by example in the following, a fixed point corresponds to a particular memory stored in the network, and nearby states contain partial information about that memory; so initializing the network (inputting initial values for the neurons) at a state nearby a particular fixed point state will recall the memory corresponding to that fixed point state by the dynamical flow. For example, if $U^1$, $U^2, \ldots, U^s$ are binary N-dimensional vectors which are fixed points for the dynamical flow and correspond to stored memories of images $1, 2, \ldots, s$, and if V is an N-dimensional vector corresponding to an observed image, then inputting V to be the initial state of the network and letting the network dynamically evolve will result in the state of the network becoming fixed at a certain $U^k$ which is the "closest" of the fixed points to V; and image k has been recalled by the network upon input of the observed image. Note that "close" in the state space is typically measured by Hamming distance: if V and W are two N-dimensional vectors of 0's and 1's, then the Hamming distance from V to W is K where V and W have K components not equal and the remaining $N-K$ components equal.

The interconnection strengths $T_{i,j}$ determine the fixed points in state space, and a possible recipe for defining $T_{i,j}$ to store a given set of memories is as follows: if states $U^1, U^2, \ldots, U^s$ are to be stored (so each $U^k$ is an N-dimensional vector of 0's and 1's), then set $$T_{i,j} = \sum_{1 \leq k \leq s} U_i^k U_j^k$$

This definition of $T_{i,j}$ implies the $U^k$ are the fixed points if the $U^k$ are uncorrelated. Further, if the $U^k$ are sparse (each $U^k$ has about pN 1's and $(1-p)$N 0's with p small) so $<U^m|U^k> \approx p^2 N$ for $m \neq k$, then the $i^{th}$ component of $U^m$ should be 0 or 1 depending on the sign of $$-\sum_j T_{i,j} U_j^m + I_i - \theta_i,$$

and inserting the definition of $T_{i,j}$ yields $$\begin{aligned}\sum_j T_{i,j} U_j^m &= \sum_j (\sum_{1 \leq k \leq s} U_i^k U_j^k) U_j^m \\ &= \sum_{1 \leq k \leq s} U_i^k (\sum_j U_j^k U_j^m) \\ &\approx \sum_{1 \leq k \leq s} U_i^k (\delta_{k,m} pN + p^2 N) \\ &\approx pN U_i^m + (s-1) p^3 N.\end{aligned}$$

Thus $U_i^m$ will not change if $$(s-1)p^3N < (\theta_i - I_i) < (s-1)p^3N + pN,$$

and $U^m$ will be a fixed point. Note that this input plus threshold constraint requires that pN be of the same order of magnitude or larger than $(s-1)p^3N$; in other words, the storage capacity s for sparse uncorrelated memories is of the order $1/p^2$.

FIG. 1 schematically illustrates a possible neural network fabricated from standard electronic components. The network, generally denoted by the reference numeral 30, includes rows and columns of wires interconnected by an array of transconductances $T_{i,j}$ 32, the horizontal wires connect to buffers 36 and threshold linear array 34 and switch bank B. The neuron states correspond to voltages on the vertical wires and the connecting righthand portions of the horizontal wires. Switch bank A (with switch bank B open) is used to input the initial network state, and the buffers 36 may incorporate the random adjustment timing. If input $I_i$ are needed, they are entered at the lefthand ends of the horizontal wires.

Figure 2:
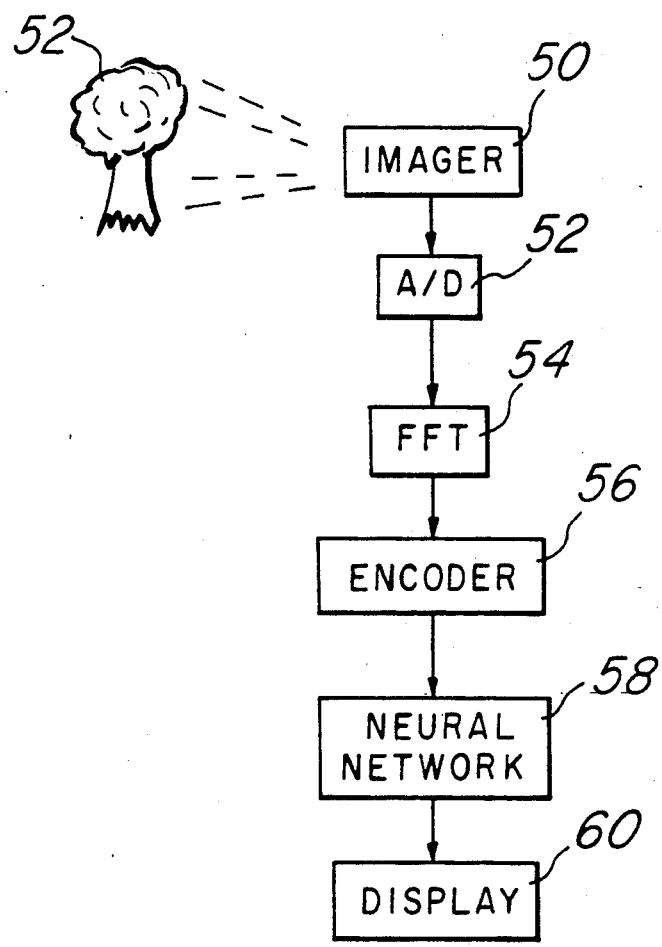
FIG. 2 illustrates encoding of image information to neural network compatible information.

FIG. 2 illustrates in schematic block form a use of a neural network for image recognition: Imager 50 (such as a CCD TV camera) views image 52 and outputs a sequence of real numbers corresponding to pixel intensities in raster scanned format; the real numbers are quantized by analog-to-digital converter 52; a discrete Fourier transform is performed (frame-by-frame if a series of images are being considered) by Fast Fourier Transform hardware (or software) 54 which outputs a sequence of (complex) integers corresponding to transform pixel intensities in raster scanned format. Then the integers are encoded as binary numbers by encoder 56 to be compatible with the binary nature of the neurons of neural network 58. The binary numbers are used as the input state $V = [V_1, V_2, \ldots, V_N]$ to neural network 58. The transconductance matrix $T_{i,j}$ for neural network 58 could have been formed by the previously described method of setting:

$$T_{i,j} = \sum_{1 \leq k \leq s} U_i^k U_j^k$$

where $U^1, U^2, \ldots, U^s$ are the uncorrelated binary encoded discrete Fourier transformed image information for a stored set of s images. Then the dynamics of neural network 58 will flow from the imput state V to one of the fixed point states, say $U^m$, and the stored image corresponding to $U^m$ will be the image recognized by neural network 58 given the input image 52; the neural network state is observed on display 60.

A numerical illustration shows the problem of the conversion of the essentially real number output of sensors (TV camera) to binary form encoding for input to the neural network and dynamical flow computation. In particular, consider a greatly simplified network with $N = 5$, no inputs $I_i$, thresholds $\theta_i$ all equal to $\frac{1}{2}$ and $T_{i,j}$ formed by storing $U^1 = [0,0,0,0,1]$ and $U^2 = [1,0,0,0,0]$; thus $$T = \begin{bmatrix} 1 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 1 \end{bmatrix}.$$

$U^1$ is a fixed point because $\Sigma_j T_{i,j} U_j^1$ equals 1 for $i = 5$ and 0 for all other i; thus the thresholds $\theta_i$ make $U_5^1 = 1$ and the remaining components 0 which means no changes. Similarly, $U^2$ is a fixed point.

Then input $V = [1,1,1,1,0]$ as the initial state of the network. V is not a fixed point: $\Sigma_j T_{i,j} V_j$ equals 1 for $i = 1$ and equals 0 for all other i. Thus $V_i$ should change from 1 to 0 for i equal to one of 2, 3, or 4. After this change, the computation of the new sum shows that one of the two unchanged such $V_i$s should change 1 to 0: and after this change, the computation shows that the last unchanged such $V_i$ should change 1 to 0, and the fixed point $U^2$ has been reached by the dynamical flow.

This flow from V to $U^2$ is expected because the Hamming distance (in state space) between V and $U^1$ is 5 and the Hamming distance between V and $U^2$ is 2, so V appears "closer" to $U^2$ than to $U^1$. However, if $V, U^1$, and $U^2$ were obtained by the binary expression of integers, then V derived from 15, $U^1$ from 16, and $U^2$ from 1. Thus V and $U^1$ were very close as integers before conversion to binary, and V and $U^2$ were very far apart. This illustrates the problem of disruption of the closeness of numbers upon conversion to neural network compatible binary form.

First preferred embodiment encoder (corresponding to encoder 56 of FIG. 2) and encoding method are illustrated in FIG. 3 for the case of encoding input integers in the range of 0 to 15 (4 bits) to network compatible vectors of 0's and 1's: the number of neurons N is 19 ($= 16+3$) rather than the expected 4, and the N-component vector encoded for each of the integers 0 to 16 is shown horizontally adjacent to the integer. For example, 3 is encoded as $[0,0,0,1,1,1,1,0,0,\ldots,0]$. Each integer is encoded as four consecutive 1's and fifteen 0's; the number of 0's before the 1's equals the integer being encoded. This encoding is analogous to a bar graph. Two encoded integers are close in Hamming distance if and only if the two integers are close. In fact, for integral distance of 1, 2, 3, or 4 the Hamming distance is just twice the integral distance, and for integral distance of 5 or more the Hamming distance is 8. For the general case of encoding integers from 0 to N, a block of $\log_2 N$ 1's is used with the number of preceding zeros equal to the integer being encoded; the choice of $\log_2 N$ 1's was derived from the results of Willshaw described in the Background. Again, the Hamming distance between two encoded integers is twice the integral distance up to a maximum of 2 $\log_2 N$. In contrast, if the encoded vectors were interpreted as base 2 numbers in which case the integer 0 would be encoded as 15, integer 1 as 30, integer 2 as 60, and so forth; these are widely separated. Note that if the integers being encoded are modulo N, then the extra $\log_2 N - 1$ neurons are not needed and a wrap-around encoding may be used as indicated by the "X"s in the lower lefthand portion of FIG. 3.

A preferred embodiment encoder for this preferred embodiment encoding method may be made of standard hardware logic gates (see, for example, Fletcher, An Engineering Approach to Digital Design, (Prentice Hall 1980)) or performed in software or a combination.

The use of $N=2^n+n-1$ neurons for n-bit integers appears to be inefficient in that n neurons could also be used to store n-bit vectors. But this expansion of the network to use sparse vectors provides a compensating increased storage. In general, if dense N-component vectors (that is, vectors of N 0's plus 1's with approximately equal numbers of 0's and randomly distributed) are used for storage, then about $N/\log_2 N$ vectors can be stored; whereas, if sparse N-component vectors of $\log_2 N$ 1's are used, then $(N/\log_2 N)^2$ vectors can be stored. Note that the total number of bits being stored ($N^2/\log_2 N$) is the same whether dense or sparse vectors are being stored. Of course, the first preferred embodiment encoding only provides about N stored vectors.

Another advantage of the first preferred embodiment encoding resides in the form of $T_{i,j}$. In particular, if the recipe for storing vectors $U^1, U^2, \ldots, U^s$ by $T_{i,j}=\Sigma k\, U_i^k U_j^k$ is used with vectors $U^s$ that are sparse, then most of the $T_{i,j}$ are either 0 or 1, and if the distance between any two $U^k$s is $\log_2 N$, then all of the $T_{i,j}$ are 0 or 1. Thus gray scales for the $T_{i,j}$ may not be needed and simpler digital devices rather than analog devices such as resistors may be used to implement networks as in FIG. 1. Note that with non sparse vectors the $T_{i,j}$ are typically of order N.

The second preferred embodiment encoder and method is illustrated in FIG. 4 for integers 0–15 and is a permutation of the columns of the first preferred embodiment encoder. Consequently, the second preferred embodiment has the same closeness preserving properties as the first preferred embodiment.

Third preferred embodiment encoder and method uses two N/2-component vectors of 0's and 1's with each of the N/2-component vectors encoded as in the first or second preferred embodiments and the two vectors joined to form one N-component vector. However, the two subvectors are not treated equally, but rather like a more significant bit and a less significant bit, or like the hour and the minute in a clock. This unequal treatment is accomplished by replacing in the adjustment rule the term $$\sum_{1 \leq j \leq N} T_{i,j} V_j$$

with the term $$\sum_{1 \leq j \leq \frac{N}{2}} T_{i,j} V_j \Lambda + \sum_{\frac{N}{2} < j < N} T_{i,j} V_j$$

where $\Lambda$ is a factor greater than 1 and emphasizes the subvector comprising the first N/2 components. This permits the encoding of $(N/2)^2$ integers by interpreting the subvector comprising the first N/2 components as multiples of N/2. The appropriate size for $\Lambda$ will depend upon the threshold levels being used. Note that this partitioning of the N-component vector into two subvectors and applying a factor of $\Lambda$ to one subvector amounts to redefiing the inner (dot) product in state space: if $<V|W>$ is defined as $$\sum_{j \leq \frac{N}{2}} V_j W_j \Lambda + \sum_{j > \frac{N}{2}} V_j W_j,$$

then writing $T_{i,j}$ as $T = \sum_{1 \leq k \leq s} U^k \; U^k$, and $$\Sigma_j T_{i,j} V_j \text{ as } \sum_{1 \leq k \leq s} U^k < U^k | V >$$

yields the new adjustment rule. This redefinition of the inner product and partitioning of the vectors permits greater precision for the encoding.

A fourth preferred embodiment encoder and method uses partitioning of the N-component vector into more and less significant parts as in the third preferred embodiment encoder and method but uses more than one level of partitioning. The partitioning is chosen to maximize the efficiency of storage of vectors as follows: for random sparse N-component vectors with $\log_2 N$ 1's, a total of $(N/\log_2 N)^2$ vectors can be stored, and for the first and second preferred embodiments a total of only N vectors exist. Equating these storage numbers shows that N is optimally about 16. Thus the fourth preferred embodiment encoder and method uses partitioning with subvectors of 16 components.

The preferred embodiment encodings with 16 component vectors (use wrap around encoding) may conveniently be used with 16-bit processors because each vector will just be one word.

MODIFICATIONS AND ADVANTAGES

Various modifications of the preferred embodiment encoders and methods may be made while retaining the features of bar graph encoding. For example, the particular symmetric $T_{i,j}$ formed by a sum of tensor products of the preferred embodiments could be replaced with arbitrary matrices, although the sparse encoding likely will correspond to $T_{i,j}$ with small gray scales. The $T_{i,j}$ could be truncated as suggested in the Hopfield article cited in the Background. Boltzmann machine type thermal adjustments could be used for networks not relying on local minima fixed points; the closeness preserving encoding of the preferred embodiments will still be useful. Similarly, the integers encoded need not be an interval 0 to N, but rather any set of N integers could be ordered and encoded according to the ordering: and the closeness of the ordering will be preserved as closeness of the encoded vectors.

The invention provides the advantages of a closeness preserving encoding of integers to nerual network compatible binary vectors.

What is claimed is:

1. A information processing system comprising:
   circuitry for providing a sequence of information signals;
   an encoder which receives said sequence at an input of said encoder and comprises circuitry for processing a plurality of series of two state electrical signals representative of code vectors, each code vector corresponding to one of said information signals, wherein each code vector comprises circuitry for processing a fixed number of electrical component signals, wherein said circuitry is programmed such that a portion of said component signals are assigned to one of said two states and the remaining signals are assigned to the other of said two states, and wherein for any two information signals, the Hamming distance between said corresponding code vectors is within a selected closeness no greater than twice said fixed number if said two information signals are within said selected closeness; and a neural network connected to an output of said encoder, said neural network comprising a fixed number of inputs equal to said fixed number of electrical component signals wherein said circuitry for processing each of said electrical signal components is connected such that each neural network input corresponds to one of said electrical signal components.

2. The computation system of claim 1, wherein said circuitry for processing said two state electrical signal components representing said code vector signals comprises circuitry operable for:

arbitrarily assigning said portion of said signal components of the output code vector corresponding to the first information signal to a selected one of the two given states, and assigning the remaining signal components to the other state;

for each of the remaining output code vectors, assigning said portion of signal components to said selected state such that the Hamming distance between any two output code vectors corresponds with the distance between any two information signals within said closeness.

3. The computation system of claim 2, and wherein said circuitry for providing a sequence of information signal further comprises circuitry for partitioning each information signal into at least two parts prior to generation of said code vector signals.

4. The computation system of claim 1, wherein said circuitry for processing a fixed number of electrical component signals is programmed such that said portion of signal components is equal to the base two log of said fixed number of electrical components.

5. The computation system of claim 1, wherein said circuitry for providing a sequence of information signals comprises circuitry for providing a sequence of information signals which represent integer numbers.

6. The computation system of claim 1, wherein said encoder comprises circuitry for processing a lookup table 7. The computation system of claim 1, wherein said encoder comprises logic gates.

8. The computation system of claim 1 wherein said circuitry comprises:

circuitry for viewing a physical image and creating an electrical signal with characteristics corresponding to the physical image;

an analog-to-digital converter connected at the output of the means for viewing the physical image;

circuitry for performing a Fast Fourier Transform, wherein the input is connected to the output of the analog-to-digital converter and the output is connected to the input of the encoder.

9. The computation system of claim 8 wherein said circuitry for viewing comprises a television camera.

10. The computation system of claim 1 and further comprising means for displaying at the outputs of the neural network.

11. A method of processing information comprising:
providing a sequence of information signals;
receiving said sequence of information signals at an input of an encoder;
generating a plurality of series of two state electrical signals representative of code vectors in said encoder;
assigning a fixed number of said electrical signals to one of said two states and assigning the remaining electrical signals to the other of said two states;
assigning each of said information signals to a corresponding one of said series of two state electrical signals such that the Hamming distance between any two of said information signals is within a selected closeness no greater than twice said fixed number if the two corresponding information signals are within said selected closeness;
providing said two state electrical signals to an input of a neural network; and
processing said two state electrical signals within said neural network.

12. The method of claim 11, wherein said generating step comprises generating the state of hardware logic gates.

13. The method of claim 11, wherein said step of providing a set of information signals comprises:
viewing a physical image and creating an electrical signal with characteristics corresponding to the physical image;
digitizing said electrical signal in an analog-to-digital converter; and
performing a Fast Fourier Transform on said digitized electrical signal.

14. The method of claim 13, wherein said step of viewing a physical image comprises viewing a physical image through a television camera.

15. The method of claim 11, wherein said step of providing a set of information signals comprises providing sensor information and said step of processing said electrical signals within said neural network comprises classifying said sensor information.

16. The method of claim 11, wherein said step of processing said two state electrical signals comprises the step of processing said two state electrical signals with an unequal weight assigned to each signal.

* * * * *